350-96.1 SR
XR 3,112,360
1 X 3083 T
CROSS REFERENCE SEARCH ROOM

SCANNING WITH LIGHT-CONDUCTING ROD

Filed June 15, 1962 3 Sheets-Sheet 1

INVENTOR:
David Paul Gregg
By Keith D. Beecher
Attorney

3112360
OR IN 358/50

Nov. 26, 1963 D. P. GREGG 3,112,360

SCANNING WITH LIGHT-CONDUCTING ROD

Filed June 15, 1962 3 Sheets-Sheet 2

INVENTOR:
David Paul Gregg
By Keith D. Beecher
Attorney

Nov. 26, 1963 D. P. GREGG 3,112,360

SCANNING WITH LIGHT-CONDUCTING ROD

Filed June 15, 1962 3 Sheets-Sheet 3

INVENTOR:
David Paul Gregg
By Keith D. Beecher
Attorney 3,112,360

SCANNING WITH LIGHT-CONDUCTING ROD

David Paul Gregg, Los Angeles, Calif., assignor to Winston Research Corporation, Beverly Hills, Calif., a corporation of California Filed June 15, 1962, Ser. No. 202,847
15 Claims. (Cl. 178—5.4)

The present invention relates generally to optical scanning instruments, and it relates more particularly to an improved television camera tube for use in monochrome or color television systems for converting optical scenes and images into electrical video signals.

The present day television camera tube is used in general to generate electrical signals representing the light and shade values of the optical image projected on the screen of the camera tube. In accordance with the usual prior art practice, the projected image on the screen of the camera tube is scanned in a particular manner, and as each point on the image is so scanned, an electrical video signal having an intensity corresponding to the light intensity of that particular point is produced by the tube and its associated circuitry.

Probably the best known of the prior art type of television camera tube is the image orthicon. At the present time, the image orthicon is used almost exclusively in commercial television broadcasting. This instrument is essentially a monochrome television camera tube. However, it may be used with appropriate filters in a set of three to constitute a camera for color television. When so used for color television, the three image orthicon tubes in the set generate electrical video signals representing respectively, in accordance with present day standards, the red, green and blue optical components of the scene or image projected onto the image plane of the color television camera.

The prior art image orthicon tube is an extremely complicated, delicate and highly costly instrument. It includes a photo-emissive film which is deposited inside the face of the tube which receives the optical image. The photo-emissive film is semi-transparent, so that when an optical image is focused on one face of the film, photo-electrons are emitted from the other face. An electrostatic field is provided within the tube to draw the photo-electrons in essentially parallel streams to a sharp focus on a target disposed within the tube.

The target of the prior art image orthicon includes a wire mesh screen facing the photo-emissive film and a glass membrane. The photo-electrons from the photo-emissive film produce a charge pattern on the glass membrane. This charge pattern corresponds to the light and shade values of the optical image focused on the face of the tube.

An electron beam is generated in the prior art image orthicon tube, and this beam is scanned over the rear face of the glass membrane mentioned in the preceding paragraph. As the beam is scanned across the surface of the glass membrane, it produces a return beam, and the return beam undergoes current variations in correspondence to variations in the charges across the surface of the glass membrane.

Therefore, the return beam of the prior art image orthicon is intensity modulated in accordance with the various charges which, in turn, represent the light intensities of the scene or image projected onto the tube. These current variations of the return beam are used in known manner to produce the corresponding electrical video signals.

Other types of prior art television camera tubes, such as the inconoscope, and the like, are predicated on essentially similar operating principles; and exhibit the same inherent complexities; so as to be, likewise, delicate and costly.

The prior art television camera tubes owe their complexity to the fact that all provide for a series of operations which must be carried out before the corresponding video electrical signals are generated. That is, the prior art television camera tubes all provide first for the storage of minute electrical charges corresponding to the light intensity values of the optical images. Then, and as a second and separate operation, these individual charges in the prior art camera tubes are scanned by an electron beam to produce the desired video electrical signal.

The above-mentioned inherent complexities in the construction and design of the prior art television camera tubes have caused them to be extremely expensive and difficult to construct and operate, and also to have extremely short operational lives.

For example, present day image orthicon tubes, of the type described previously herein, usually have a maximum operational life of the order of 250 to 300 hours; and these tubes cost approximately $1,200.00 each on the present day market and about $14.00 an hour to operate. These costs are multiplied three-fold, of course, in the prior art color television cameras where the tubes are used in sets of three in accordance with the prior art practice.

An important object of the present invention is to provide an improved optical scanning instrument, such as a television camera tube, which can be used equally well in monochrome or color television systems, and which is inherently simple and direct in its operation so as to result in an instrument which functions in an improved and vastly simplified manner as compared with the prior art television camera tubes.

Another object is to provide such an improved optical scanning instrument which may be manufactured and sold at a fraction of the cost of the usual prior art instruments of this general type, and yet which exhibits superior performance characteristics, as compared with the prior art instruments.

The optical scanning instrument of the present invention is basically simple in its concept in that it provides for the optical scanning of the image projected onto the face of the instrument. This optical scanning of the projected image permits a conversion of the optical intensities directly into electrical video signals by simple photocell means, and without any need to provide individual electric storage or subsequent scanning by electron beams.

For color television purposes, and as will be described herein in detail, it is merely necessary to pass the light derived from the optical scanning operation through selective color dichroic mirrors or filters, and then to converge the resulting light beams into the corresponding color video signals.

The television camera tube in the embodiment of the invention to be described uses an elongated, flexible optical fiber element to conduct the light signals from the face of the tube to the photocell means.

The optical fiber element is of the type of transparent fiber recently developed for commercial purposes, and which is used to conduct light signals from one end of the fiber element to the other. The fiber element is flexible, and it is capable of being twisted and turned so as to transmit the light signals along a tortuous path. This capability of the optical fiber makes it well suited for scanning purposes, as will be described herein.

For effective transmission of the light signals along its length, the optical fiber element is made highly transparent with smooth reflective surfaces. Under these conditions, the light entering one end of the fiber element is transmitted to the other end by repeated reflections.

The optical fiber element is made of highly transparent material, as noted above, such as glass or clear plastic;

and the element usually relies on the total internal reflection principle to achieve its light transmission. The fiber dimensions are not critical provided that the diameter is large as compared with the wavelength of the light to be transmitted. A fiber diameter of the order of .05 mil is feasible, for example.

In the practice of the present invention in the embodiment to be described, the optical fiber element is sheathed with a conductive metal, or conductive glass. The element is affixed to a stationary support at one end only, its other end being free to move in all directions. The fiber is then subjected to varying transverse electrostatic fields. These fields are controlled so that the free end of the fiber is scanned, in a manner to be described, and in a line and field direction, over an image area so as to provide a desired optical scanning of the optical image projected onto that area.

The light signals from the optical image scanned by the free end of the fiber element are propagated down the fiber element as it is scanned across the image area. For color television purposes, the light emitted from the fixed end of the fiber element is split three ways by dichroic mirrors or filters of red, blue and green, for example. The light output from the filters or mirrors is then directed to respective photocells for conversion into video electrical signals, and the electrical video signal outputs from the different photocells are video signals corresponding to the red, blue and green components of the optical image projected onto the image area of the tube.

Other objects, features and advantages of the present invention will become apparent from a consideration of the following detailed description, when taken in conjunction with the accompanying drawings, in which.

Figure 1:
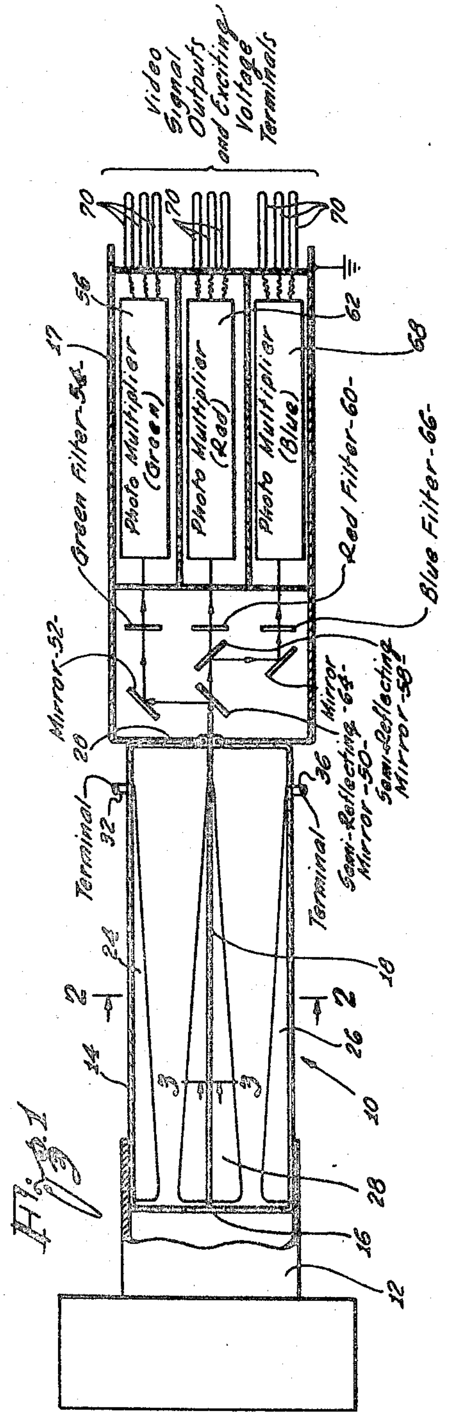
FIGURE 1 is a side elevational view, partly in section, schematically illustrating a color television camera constructed to incorporate the concepts of the present invention.

The television camera tube illustrated in FIGURE 1 is capable for use in color television systems, as mentioned above. The camera tube is designated generally as 10, and it includes a lens portion 12 mounted on its forward end.

The television camera 10 includes an evacuated envelope 14 having, in the illustrated embodiment, an elongated cylindrical configuration. The forward end of the envelope 14 is preferably opaque, with the exception of a small rectangular area. This latter area forms the image plane 16, and it may measure, for example, 1 millimeter by 1 millimeter.

The lens system 12 serves to project the image or scene to be televised onto the image plane 16, and on a reduced scale. The lens system 12 may be constructed in accordance with well established optical principles to contain a suitable number of suitably shaped lenses for projecting the image onto the image plane 16.

The rear end of the evacuated envelope 14 is attached to a cylindrical housing 17. The forward wall of the housing 17 forms a stationary support 20 for an elongated flexible optical fiber element 18. The housing 17 may be formed of metal and grounded to provide a ground connection for a sheath 22 which is deposited on the fiber element 18. Of course, any other suitable ground connection to the sheath may be provided. The right hand end of the fiber element 18 in FIGURE 1 is supported in the stationary support 20, and this end of the fiber element projects through the stationary support 20 in electrical grounded connection therewith.

The left hand end of the flexible optical fiber element 18 in FIGURE 1 is disposed closely adjacent the surface of the image plane 16. This left hand end of the fiber element is unsupported, and it may be freely scanned over the image plane.

Figures 2, 3, 4:
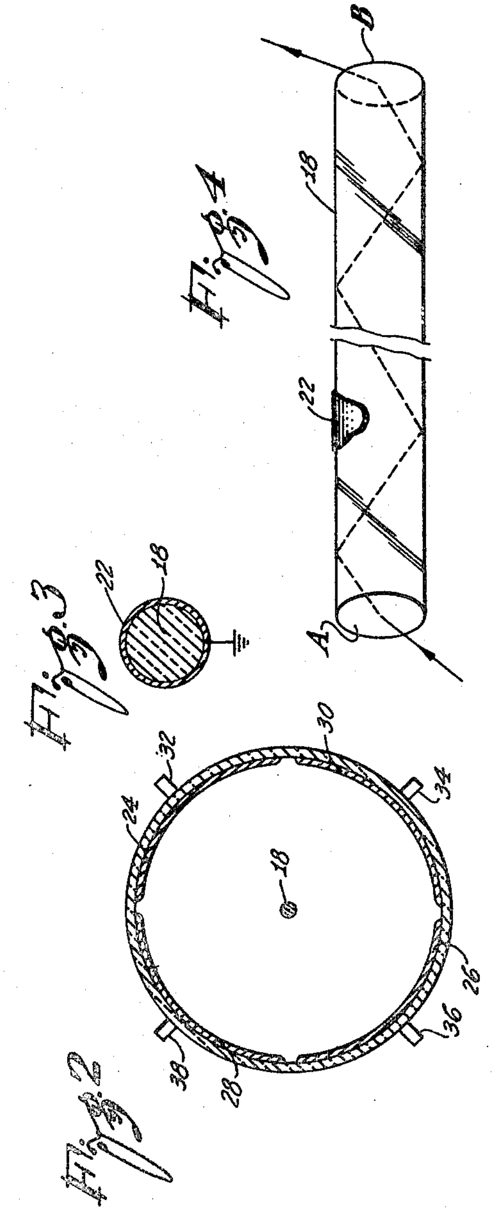
FIGURE 2 is a cross-sectional view of the television camera of FIGURE 1 taken along the lines 2—2 of FIGURE 1.
FIGURE 3 is a cross-sectional view, on an enlarged scale, of an optical fiber element incorporated in the television camera of FIGURE 1.
FIGURE 4 is an enlarged schematic representation of an optical fiber element, similar to the element utilized in the television camera of FIGURE 1, and illustrating the manner in which light is conducted from one end of the element to the other.

The elongated flexible fiber element 18, as shown in FIGURE 3, is coated by a sheath 22 of a conductive material, such as a metal, or by a conductive glass. The sheath 22 extends along the length of the fiber element 18, and it permits the fiber element to be subject to a deflecting action in response to an electrostatic field. The fiber element may, for example, have a diameter of the order of .04 mil; and the fiber sheath is extremely thin so that it will not affect adversely the optical conductive properties of the fiber.

The electrostatic field is formed by a plurality of metallic deflection plates 24, 26, 28 and 30. These plates may be in the form of electrically conductive coatings on the internal surface of the envelope 14. Appropriate electrical connections are made to the plates by corresponding terminals 32, 34, 36 and 38. These terminals extend through the envelope 14, and they are connected to respective ones of the plates.

The deflection plates 24, 26, 28 and 30 have a triangular configuration, as best shown in FIGURE 1, so that each plate increases in transverse dimensions from the fixed end of the elongated fiber element 18 to the free end thereof. The deflection plates 24, 26, 28 and 30 produce a field (or vertical) deflection electrostatic field for the fiber element 18, and these plates have the above-mentioned triangular configuration, so that the deflection force on the sheathed fiber element 18 may increase linearly along the element from its fixed end to its free end. This force increase is desired, of course, because the fiber is to be deflected by greater and greater amounts from its fixed end to its free end.

Likewise, the deflection plates 24, 26, 28 and 30 produce a line (or horizontal) electrostatic deflection field for the fiber element 18, and the triangular configuration of the plates in the embodiment of FIGURES 1 and 2 provides the desired increase in horizontal deflection force from the fixed to the free end of the fiber element.

It is clear, therefore, that the application of appropriate field deflecting signals to the deflection plates 24, 26, 28 and 30 by way of the terminals 32, 34, 36 and 38 causes the resulting electrostatic fields to control the vertical, or field, deflection of the end of the optical fiber element 18 across the image plane 16; and the line, or horizontal, deflection of the fiber element 18 across the image plane 16.

The optical fiber element 18 may be scanned across the image plane 16 in a series of successive interlaced fields, and the fiber deflection element may be scanned in each field in a succession of successive lines.

It has been determined, for example, that the optical fiber element 18 may be scanned across a 1 millimeter by 1 millimeter image plane 16 with a resolution of approximately 1,000 lines. It has also been determined that the desired line scanning of the fiber element 18 can be provided with deflection signal potentials of the order of 50 kilovolts, at a frequency of one-half the usual horizontal, or line, scanning frequency of 15,734 cycles by present day standards.

As the optical fiber element 18 is scanned across the image plane 16, the light and shade values of the image projected onto the image area are successively scanned by the free end of the element 18. The corresponding light signals representing elemental areas of the scanned image are conducted through the fiber element 18 from its free end back to its fixed end.

The resulting light signals from the fixed end of the fiber element 18 are projected onto a semi-reflecting mirror element 50 mounted in the housing 17. This semi-reflecting mirror element 50 may, for example, be of the half silvered type, this type of mirror being capable of reflecting a portion of the light incident thereon and of passing a further portion of the light. The reflected portion of the light incident on the mirror 50 is directed to a second mirror 52 which is also mounted in the housing 17 and which, in turn, reflects the light through a green filter 54 of any known construction onto a photocell in the housing which may, for example, be in the form of a usual present day photo-multiplier 56.

In like manner, the light passed by the semi-reflecting mirror 50 is directed to a second semi-reflecting mirror 58 in the housing 17. The light incident on the second semi-reflecting mirror 58 is passed in part through a red filter 60 in the housing to a photocell, such as a photo-multiplier 62; and the reflected portion of the light incident on the semi-reflecting mirror 58 is directed to a further mirror 64 in the housing 17 from which it is reflected through a blue filter 66 to a third photocell, such as a usual photo-multiplier 68.

As mentioned above, the gree filter 54 may be constructed in any suitable manner, as may the red filter 60 and the blue filter 66. Furthermore, the respective mirror elements may be of the dichroic type which, as is well known, to reflect only the desired red, blue and green color components of the light incident thereon. In this manner, the filters may be incorporated directly into the mirror elements, and the separate filters dispensed with.

The electrical output signals from the photo-multipliers 56, 62 and 68 are introduced to appropriate electrical contact pins 70 at the rear end of the camera housing 17 in FIGURE 1, and these pins may be connected into any suitable electrical circuit.

It is evident, therefore, that as the free end of the fiber optical element 18 is scanned across the image plane 16, light signals are conducted along the fiber element to its right hand end in FIGURE 1. The light signals corresponding to the green components of the projected image are applied to the photo-multiplier 56 in which they are converted into video electrical signals representative of the green light components.

In like manner, the red light components are directed to the photo-multiplier 62, so that a second video signal is generated corresponding to the red components of the image on the image area 16. Similarly, the photo-multiplier 68 produces a video signal corresponding to the blue color components of the image on the image area 16.

The video signal components developed by the photo-multipliers 56, 62 and 68 contain the information concerning the scene to be televised, and the various color components of that scene. These signals may be introduced to the usual color television transmitter in exactly the same manner as the signals produced by the prior art color television camera. The color television transmitter mixes, in usual manner, the required blanking and synchronizing signals with the video signals, and radiates the resulting composite color television signal on a suitable carrier.

The optical fiber element 18 is shown in somewhat schematic form in FIGURE 4, and on an enlarged scale, to indicate the manner in which light is transmitted from one end of the fiber to the other. As mentioned above, the optical filter 18 is a transparent fiber which is used to conduct light along its length. As also noted, the fiber is flexible and is able to convey images around corners or through tortuous channels.

When the optical fiber element 18 is highly transparent and has smooth reflective surfaces, the light entering the right hand end of the fiber is transmitted to the other end by repeated reflections, as shown in FIGURE 4. For conduction over distances which are long as compared with the fiber diameter, the large number of reflections makes it necessary for a high reflection efficiency, and this is achieved by use of the known phenomenon of total internal reflection. This total internal reflection is achieved by providing for an extremely thin metallic sheath 22.

The transmission of light along the fiber element 18 of FIGURE 4 is basically a waveguide phenomenon. Light striking the left hand end A within a certain maximum core angle will be totally reflected from the sides and thereby conducted to the remote end B.

When the fiber element 18 is moved relative to the image projected on the image area 16 in FIGURE 1, the resolving power of the element is well defined, and corresponds to that of a flying spot scanner with a spot size equal to the size of the fiber itself. As noted above, when the image area 16 is of the order of 1 millimeter by 1 millimeter, a resolution of approximately 1,000 lines is possible with present day optical fibers.

It was pointed out above that when the optical fiber element 18 is scanned over the image plane 16 at one-half the standard line scanning rate of the present day color television system; that is, at a scanning rate of the order of 7867 cycles per second; sufficient line deflection to scan the optical fiber element 18 over the 1 millimeter by 1 millimeter image plane could be provided by a line deflection signal of the order of 50 kilovolts.

It has been found, for example, that a line deflection signal of approximately one-quarter of a million volts would be required to deflect the scanning element 18 at the standardized line scanning rate. From present day practical considerations, it would appear that it would be most feasible to deflect the optical element 18 at the lower rate.

Figure 5:
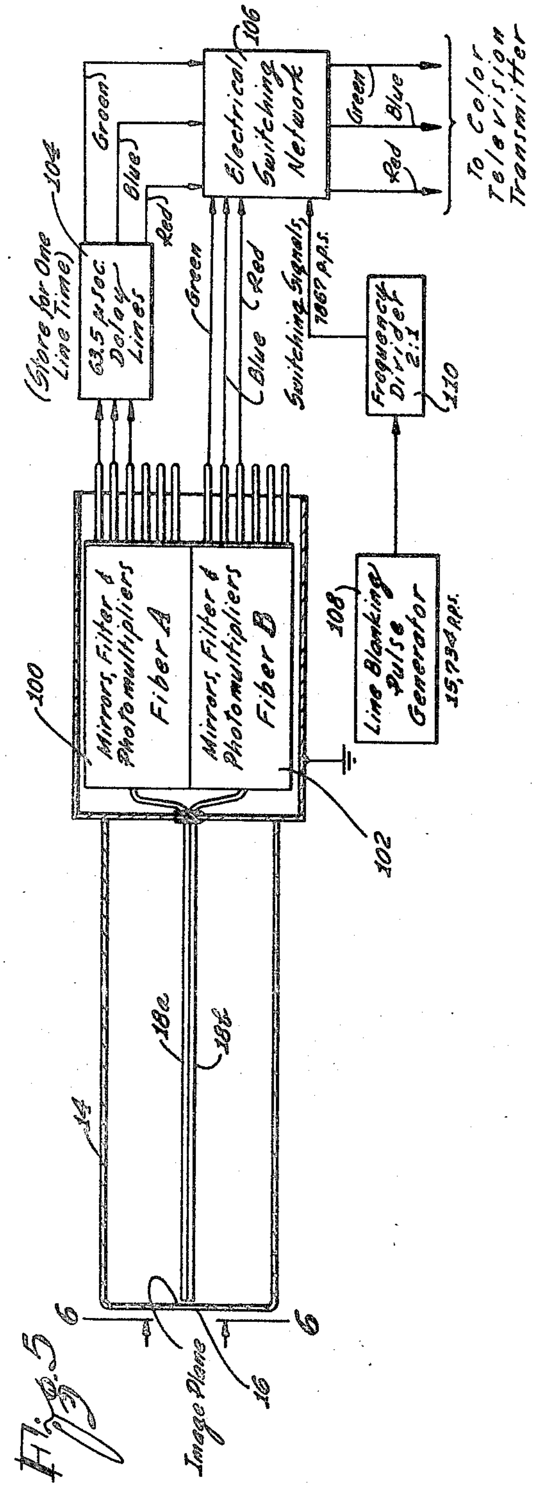
FIGURE 5 is a side sectional view of a television camera constructed to incorporate a dual fiber element in accordance with a second embodiment of the invention.
Figure 6:
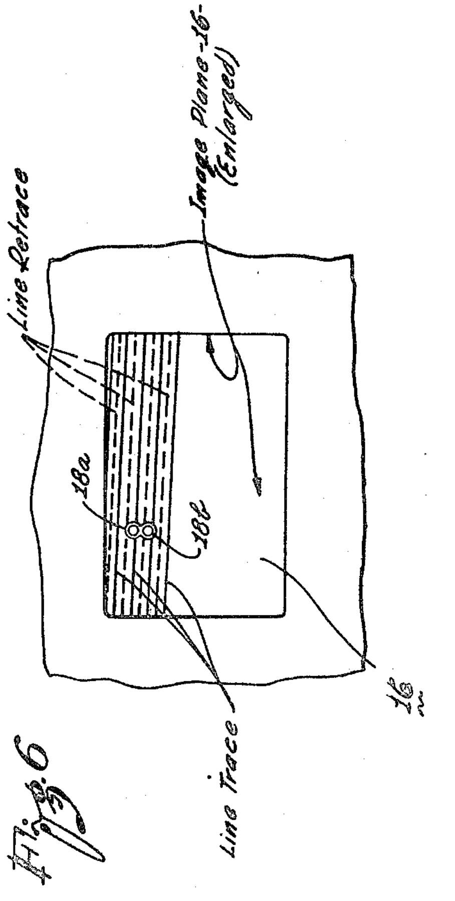
FIGURE 6 is an end view of the television camera of FIGURE 5, on an enlarged scale, and showing in particular an image area formed on the face of the tube.

In the embodiment of FIGURES 5 and 6, a pair of adjacent optical fiber elements 18*a* and 18*b* are provided. In the embodiment of FIGURE 5, the optical fiber elements 18*a*, 18*b* are positioned in the envelope 14 as described above, and an optical system, similar to the optical system 12 of FIGURE 1 is used to focus the image onto the image plane, or area, 16.

The optical fiber elements 18*a* and 18*b* are fused to one another along their lengths, and they are sheathed by a conductive coating, similar to the conductive coating 22 of FIGURE 3. This enables the deflection plates, such as the plates 24, 26, 28 and 30 of FIGURES 1 and 2, to deflect the optical elements 18*a*, 18*b* across the image plane 16.

As best shown in FIGURE 6, the optical fiber elements 18*a* and 18*b* are positioned one on top of the other, so that when they are scanned across the image plane 16, they scan adjacent lines in the image raster.

In the embodiment of FIGURE 5, the optical fiber element 18*a* is coupled to a unit 100 which may contain the mirrors, filters and photo-multipliers described in conjunction with FIGURE 1. In like manner, the optical fiber element 18*b* is coupled to a unit 102 which may contain an identical set of mirrors, filters and photo-multipliers such as described above.

The unit 100 responds in the manner described above in conjunction with FIGURE 1 to the light signals from the optical fiber element 18*a* to produce corresponding video signals representative of the red, green and blue color components of the image on the image plane 16. Likewise, the unit 102 responds to the optical signals from the optical fiber element 18*b* to produce electrical video signals representing the green, blue and red color components of the image.

The video signals from the unit 100 are passed through corresponding delay lines, represented by the block 104 in FIGURE 5, in which each signal is delayed a precise time interval corresponding to the time required to complete one-half a line scanning cycle. The delayed video signals from the delay line 104 are applied to an electrical or electronic switching network 106, as are the video signals from the unit 102.

The color television transmitter in which the tube of FIGURE 5 to to be incorporated will include a line blanking pulse generator, as represented by the block 108, and this generator produces line blanking pulses at the standard rate, for example, of 15,734 pulses per second. The pulses from this line blanking pulse generator are passed through a frequency divider 110 of any known construction, and the frequency divider divides the pulses to a frequency of 7867 pulses per second which, is half the frequency of the line blanking pulses.

The pulses from the frequency divider 110 are used as switching signals in the switching network 106. The network 106 may be any suitable switching network which responds to the switching signals from the frequency divider 110 selectively to introduce the signals from the delay lines 104 and the signals from the unit 102 to the three output leads from the switching network.

The above-mentioned output leads carry the red, green and blue video signals to the associated color television transmitter. The arrangement is such that for each even line scanned during each field, for example, the signals from the unit 102 are applied to the color television transmitter, and for each odd line scanned during the field, the signals from the delay line 104 are applied to the transmitter.

Figure 7:
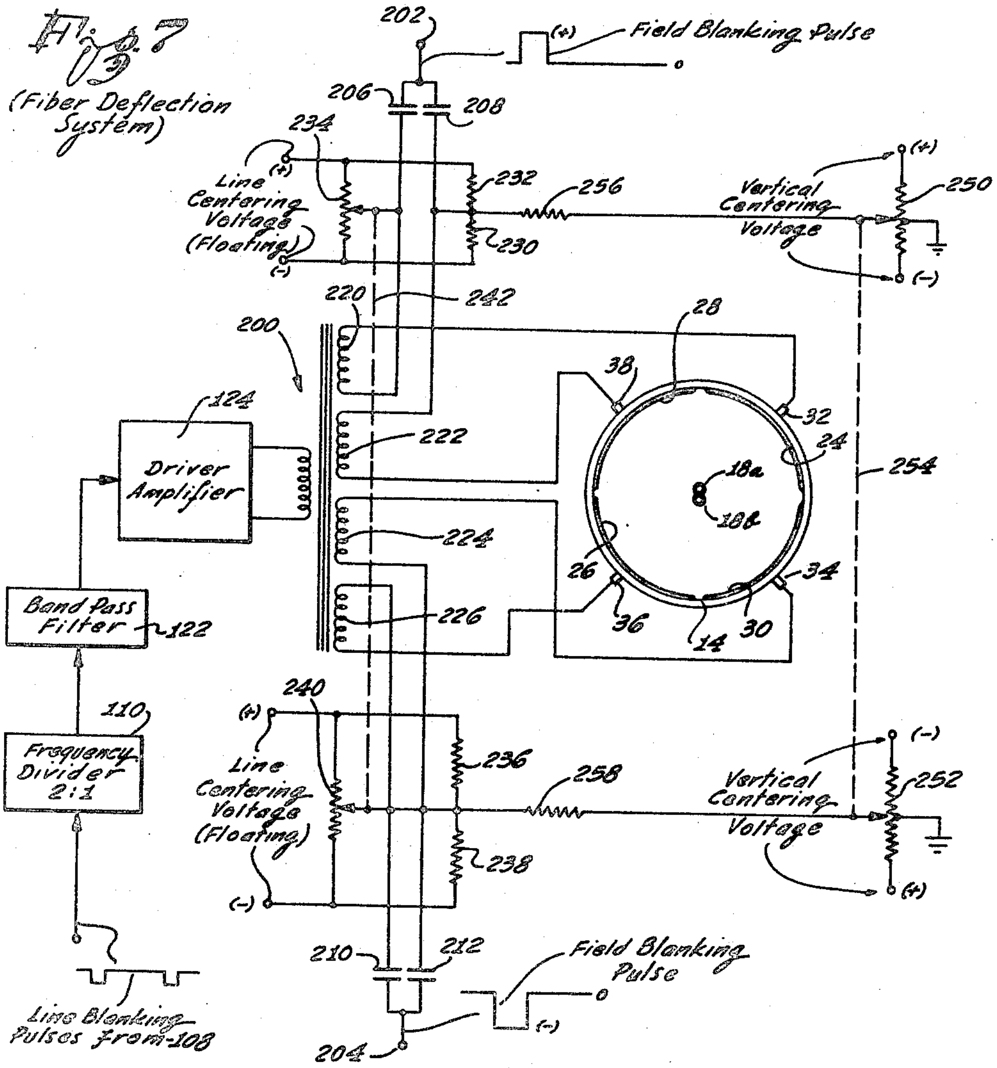
FIGURE 7 is a circuit diagram of an appropriate system for supplying deflection signals for the television camera tube of FIGURES 1 and 2.
Figure 8:
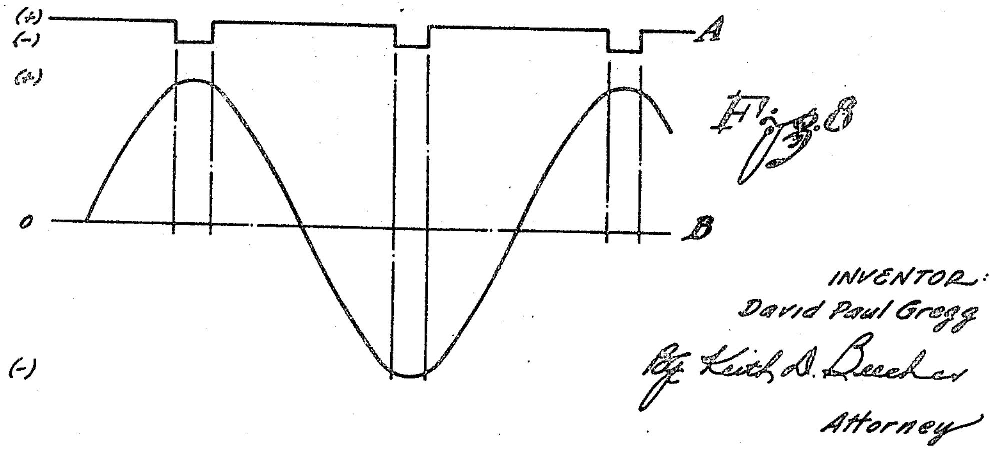
FIGURE 8 is a series of curves useful in explaining the operation of the illustrated embodiments of the invention.

In a manner to be described, the line, or horizontal, blanking pulses from the pulse generator 108, as represented by the curve A in FIGURE 8, are frequency divided by the frequency divider 110 in FIGURES 5 and 7, and introduced through a bandpass filter 112 in FIGURE 7 to a drive amplifier 124 to have a sine wave configuration, as shown by the curve B in FIGURE 8, and a frequency corresponding to one-half the repetition frequency of the horizontal blanking pulses.

As noted above, the frequency of the sine wave, by present day standards would be 7867 cycles. When the sine wave of the curve B of FIGURE 8 is applied to the deflection plates 28 and 30 in the television camera of FIGURE 1, or to the plates corresponding thereto in the television camera of FIGURE 5, the optical fiber elements 18*a* and 18*b* are drawn horizontally across the image area from the left to the right in FIGURE 6, while the curve B of FIGURE 8 is increasing in amplitude from its maximum negative peak to its maximum positive peak. In like manner, the optical fiber elements 18*a* and 18*b* are returned horizontally from the right to the left in FIGURE 6 when the sine wave of the curve B of FIGURE 8 is decreasing from its maximum positive peak to its maximum negative peak. The sine wave, therefore, causes the optical fiber elements 18*a* and 18*b* to be drawn across the image area 16*a* in a series of horizontal scans, from left to right, and then to be returned across the image area in a series of retrace horizontal scans from right to left.

During each horizontal trace, the free ends of the optical elements 18*a* and 18*b* are drawn across adjacent lines of the image area 16 from the left to right in FIGURE 6. The two optical elements are then returned in the intervening retrace lines, and the field deflection signal causes the next trace lines to be displaced down to the next pair of positions.

The action of the system of FIGURE 5, in conjunction with the sine wave deflection signal of FIGURE 8, causes the optical information in each line scanned by the optical fiber element 18*b* to be applied as corresponding video signals to the color television transmitter during each line trace, whereas the optical information in the adjacent line scanned at the same time by the optical fiber element 18*a* is not lost, but is stored and supplied to the color television transmitter during the next equal length retrace interval.

Therefore, the color television camera of FIGURE 5 supplies line video signals to the color television transmitter at the usual line scanning rate, even though the scanning itself proceeds at one-half the standard rate.

As mentioned above, the required deflection signals for the deflection plates 28, 30, 24 and 26 may be supplied by the circuit of FIGURE 7.

In the circuit of FIGURE 7, the line deflection sine wave of curve B of FIGURE 8 is supplied by the drive amplifier to the primary winding of a transformer 200. The secondary windings of the transformer may be wound to resonate at 7867 cycles. These windings are connected to respective ones of the deflection plate terminals 32, 34, 36 and 38, as illustrated.

The positive and negative field blanking pulses from the field blanking pulse generator in the associated transmitter are applied to the terminals 202 and 204 which, in turn, are coupled through appropriate capacitors 206, 208, 210 and 212 to the other sides of each of the secondary windings of the transformer 200. Appropriate centering circuits may also be provided, as shown.

Specifically, the transformer 200 includes a first secondary winding 220 which is connected to the deflection plate 24 by way of the terminal 32 and to the capacitor 206. The transformer also includes a second secondary winding 222 which is connected to the deflection plate 28 by way of the terminal 38 and to the capacitor 208. The transformer 200 also includes a secondary winding 224 which is connected to the deflection plate 30 by way of the terminal 34 and to the capacitor 212. Finally, the transformer 200 includes a secondary winding 226 which is connected to the deflection plate 26 by way of the terminal 36 and to the capacitor 210.

It will be observed that the capacitors 206 and 208 are connected to the common terminal 202, and that the capacitors 210 and 212 are connected to the common terminal 204. The capacitors 206 and 208 exhibit a low impedance to signals of the frequency of the line deflection signal, so that the line deflection signal is produced across the secondary windings 220 and 222, as if these windings were connected in series for that signal.

Likewise, the capacitors 210 and 212 exhibit a low impedance to the line, or horizontal deflection signal, so that the line deflection signal is also induced across the windings 224 and 226, as if these latter windings were connected in series for that signal.

The relative phase between the line deflection signal produced across the secondary windings 220 and 222 of the transformer 200, and the line deflection signal produced across the secondary windings 224 and 226, is such that the line deflection signal applied to the deflection plates 26 and 28 is 180° out of phase with the line deflection signal applied to the deflection plates 24 and 30. Therefore, the introduction of the line deflection signal to the primary of the transformer 200 by the drive amplifier 124, causes the fiber elements 18*a* and 18*b* in FIGURE 7 to be swept horizontally back and forth across the image plane, as the line deflection signal describes the sine wave shown in FIGURE 8.

A pair of resistors 230 and 232 are connected in series across a unidirectional floating source of line centering voltage, and a potentiometer 234 is also connected across the source to form a bridge circuit with the resistors 230 and 232. The common junction of the resistors 230 and 232 is connected to the secondary 22, and the movable arm of the potentiometer 234 is connected to the secondary winding 220.

A similar bridge circuit is formed by a pair of resistors 236 and 238 in conjunction with a potentiometer 240.

In the latter bridge circuit, the common junction of the resistors is connected to the winding 224, and the movable arm of the potentiometer is connected to the winding 226. The movable arms of the potentiometers 230 and 240 are mechanically inter-coupled, as designated by the dotted line 242, so that these arms may be moved in unison.

It is apparent that any shifting of the movable arms of the potentiometers 234 and 240 from their central position introduces a unidirectional positive or negative potential through the associated windings to the corresponding deflection plates. The resulting controllable field set up by the unidirectional potentials is adjustable to control the horizontal position of the fiber elements 18*a* and 18*b* to any particular desired undeflected position.

A vertical centering control is also provided by a pair of potentiometers 250 and 252. These latter potentiometers have center taps connected to ground, and are connected across an appropriate source of unidirectional potential. The movable arms of the potentiometers 250 and 252 are mechanically inter-coupled, as indicated by the dotted line 254, for uni-control. The movable arm of the potentiometer 250 is connected through a resistor 256 to the common junction of the resistors 230 and 232. Likewise, the movable arm of the potentiometer 252 is connected through a resistor 258 to the common junction of the resistors 236 and 238.

The movable arms of the vertical centering control potentiometers 250 and 252 are preferably set so that the fiber elements 18*a* and 18*b* are normally deflected in a vertical direction to a position at the bottom of the image plane 16. The introduction of the field blanking pulses to the terminals 202 and 204, causes a positive-going sawtooth signal to be applied to the deflection plates 24 and 28, and a negative-going sawtooth signal to be applied to the deflection plates 26 and 30. These sawtooth signals are formed by the integration of the pulses by the capacitors 206, 208, 210 and 212 in a manner to form the sawtooth waves.

Therefore, when the field blanking pulses are introduced to the terminals 202 and 204, the resulting charging of the capacitors causes the resulting vertical electrostatic field to move the fiber elements 18*a* and 18*b* rapidly to the top of the image plane 16. Then, the subsequent discharge of the capacitors causes the fiber elements to be moved slowly and linearly from the top of the image plane to the bottom while the line scanning process is being carried out.

The deflection system of FIGURE 7 enables the deflection plates 24, 26, 28 and 30 to perform a dual function in that all the deflection plates cooperate to produce the line deflection of the fiber elements, and all cooperate to produce the field deflection. This permits an extremely accurate control to be exerted on the fiber elements, in that it produces a maximum of deflection plate area for each of the fields. This is especially required for the horizontal deflection. The fact that in-phase voltage occurs on the plates 26 and 28 enables these plates to be positioned extremely close to one another, and this also applies to the plates 24 and 30. Therefore, a relatively large area deflecting plate surface is presented in a uniform manner for maximum line deflection efficiency.

The invention provides, therefore, an extremely simplified television camera tube which is capable of converting optical signals directly into electrical video signals without the prior art requirements of extraneous and complicated instrumentalities and systems. Furthermore, the improved television camera tube of the present invention is readily applicable to color television without any need for excessive duplication of parts, as is the case in the prior art.

While particular embodiments of the invention have been shown and described, modifications may be made, and it is intended in the claims to cover all such modifications as fall within the spirit and scope of the invention.

What is claimed is:

1. In combination: a stationary support means; an elongated, flexible member including optical fiber means and having a first end affixed to said stationary support means and having a free end; means defining an image area; and deflecting means positioned adjacent said fiber member for deflecting said elongated member to produce a controlled scanning movement across said image area of said free end thereof, said optical fiber means conducting light signals from said image area to said first end of said elongated member.

2. In combination: a stationary support means; an elongated, flexible optical fiber member having a first end affixed to said stationary support means and having a free end; an electrically conductive sheath formed on the outer surface of said fiber member; means defining an image area; and deflecting means positioned adjacent said fiber member for creating an electrostatic field to produce a controlled scanning movement across said image area of said free end of said optical fiber member, said optical fiber member conducting light signals from said image area to said first end of said fiber member.

3. A television camera tube including: an envelope having an end defining an image surface; a stationary support means in said envelope; an elongated, flexible optical fiber member mounted in said envelope having a first end affixed to said stationary support means and having a free end disposed adjacent said image surface; an electrically conductive sheath formed on the outer surface of said fiber member; and electrically conductive deflection plates positioned in said envelope for creating an electrostatic field to produce controlled scanning movement of said free end of said optical fiber member with respect to said image surface, said fiber member conducting light signals from said image area to said first end thereof.

4. A television camera tube including: an elongated envelope having a first end defining an image surface; a stationary support means positioned at the other end of said envelope, a flexible, elongated optical fiber element extending lengthwise in said envelope, said fiber element having a first end affixed to said stationary support means and having a free end disposed adjacent said image surface for conducting light signals from said image surface to said first end; an electrically conductive sheath formed on the outer surface of said fiber element; and electrically conductive deflection plates positioned in said envelope for creating an electrostatic field to produce controlled scanning movement of said free end of said optical fiber element with respect to said image surface.

5. The camera tube defined in claim 4 in which said deflection plates are in the form of electrically conductive coatings on the surface of said envelope.

6. The camera tube defined in claim 4 in which said deflection plates are shaped to provide increasing deflection forces on said fiber element from the first end to the free end thereof.

7. The camera tube defined in claim 4 in which said deflection plates include a first pair of plates for producing line deflections of said fiber elements and a second pair of plates for producing field deflections of said fiber, said deflection plates each having a triangular configuration to provide increasing line and field deflection forces on said fiber element from the first end to the free end thereof.

8. A television system including: an envelope defining an image area at one end; a stationary support means positioned at the other end of said envelope; a flexible, elongated optical fiber element mounted in said envelope having a first end extending through and affixed to said stationary support means and having a free end disposed adjacent said image area to conduct light signals therefrom to said first end of said element; an electrically conductive sheath formed on the outer surface of said fiber element; deflecting means positioned adjacent said fiber element for creating an electrostatic field to produce a controlled scanning movement of the free end of said fiber element across said image area; and photo-electric transducer means positioned in optically coupled relationship with said first end of said fiber element for transforming the light signals from such end into corresponding electrical video signals.

9. The system of claim 8 and in which said photo-electric transducer means includes means for separating the light signals from said fiber element into separate color components, and which includes separate photocells responsive to the different color components for transforming the same into respective electrical video signals.

10. A television system including: an elongated envelope having a first end defining an image surface; a stationary support means positioned at the other end of said envelope; a pair of mutually attached first and second elongated, flexible optical fiber elements extending in side-by-side relationship lengthwise in said envelope, each of said elements having a first end affixed to said stationary support means and each having a free end disposed adjacent said image surface; an electrically conductive sheath formed on the outer surface of at least one of said fiber elements; and electrically conductive deflection plates positioned adjacent said envelope for creating an electrostatic field to produce a controlled scanning movement of said free ends of said fiber elements in a repeated series of scanning lines and fields with respect to said image surface, said first and second fiber elements being positioned to scan the image surface in adjacent scanning lines, and said fiber elements conducting light signals from said image surface to said first ends thereof.

11. The system of claim 10 and which includes first and second photocell means respectively optically coupled to the fixed ends of said first and second optical elements for transforming the light signals therefrom into corresponding electrical video signals.

12. The system of claim 11 and which includes delay line means coupled to said first photocell means, and an electronic switching network coupled to said delay line means and to said second photocell means for selectively passing the electrical video signals from said delay line and second photocell to a utilization means.

13. In combination: means for defining an image plane; a flexible elongated light transmitting element having a first end fixed and having a second free end positioned adjacent said image plane; and means for producing a controlled scanning movement of said free end of said light transmitting element with respect to said image plane.

14. In combination: means for defining an image plane; lens means for projecting an image onto said image plane; a flexible elongated light transmitting element having a first end fixed and having a second free end positioned adjacent said image plane; an electrically conductive sheath formed on said fiber element; and deflecting means for creating a field to produce a controlled scanning movement of said free end of said light transmitting element across the image projected onto said image plane.

15. The combination defined in claim 14 and which includes photocell means disposed in optically coupled relationship with said first fixed end of said light transmitting element for converting light signals therefrom into corresponding electrical video signals.

No references cited.

Disclaimer 3,112,360.—*David Paul Gregg*, Los Angeles, Calif. SCANNING WITH LIGHT-CONDUCTING ROD. Patent dated Nov. 26, 1963. Disclaimer filed Mar. 21, 1967, by the assignee, *Winston Research Corporation*.

Hereby enters this disclaimer to claims 1 and 3 of said patent.

[*Official Gazette May 16, 1967.*]

Corrected Disclaimer 3,112,360.—*David Paul Gregg*, Los Angeles, Calif. SCANNING WITH LIGHT-CONDUCTING ROD. Patent dated Nov. 26, 1963. Disclaimer filed Oct. 10, 1967, by the assignee, *Winston Research Corporation*.

Hereby enters this disclaimer to claims 1 and 13 of said patent.

This disclaimer supersedes disclaimer published in the Official Gazette of May 16, 1967.

[*Official Gazette January 2, 1968.*]